US012616240B2

(12) United States Patent  
Tachikawa et al.

(10) Patent No.: US 12,616,240 B2  
(45) Date of Patent: May 5, 2026

(54) DOUBLE-LAYER SEAMLESS CAPSULE CONTAINING WATER-SOLUBLE COMPOSITION

(71) Applicant: FUJI CAPSULE CO., LTD., Shizuoka (JP)

(72) Inventors: Shoji Tachikawa, Shizuoka (JP); Miku Sasaki, Shizuoka (JP); Sergio Ishiba, Shizuoka (JP); Tsubasa Mochizuki, Shizuoka (JP); Taisuke Sano, Shizuoka (JP)

(73) Assignee: FUJI CAPSULE CO. LTD., Shizuoka (JP)

( * ) Notice: Subject to any disclaimer, the term of this patent is extended or adjusted under 35 U.S.C. 154(b) by 546 days.

(21) Appl. No.: 17/911,904

(22) PCT Filed: Mar. 26, 2021

(86) PCT No.: PCT/JP2021/012876  
§ 371 (c)(1),  
(2) Date: Sep. 15, 2022

(87) PCT Pub. No.: WO2021/193921  
PCT Pub. Date: Sep. 30, 2021

(65) Prior Publication Data

US 2023/0148278 A1 May 11, 2023

(30) Foreign Application Priority Data

Mar. 27, 2020 (JP) ................................. 2020-058864

(51) Int. Cl.  
*A24D 3/06* (2006.01)  
*B01J 13/18* (2006.01)

(52) U.S. Cl.  
CPC .............. *A24D 3/061* (2013.01); *B01J 13/18* (2013.01)

(58) Field of Classification Search  
None  
See application file for complete search history.

(56) References Cited

U.S. PATENT DOCUMENTS

| | | | |
|---|---|---|---|
| 5,362,564 A | 11/1994 | Suzuki et al. | |
| 2002/0050659 A1* | 5/2002 | Toreki | ................... A01N 25/28 |
| | | | 264/4.1 |
| 2020/0146341 A1 | 5/2020 | Rieth | |
| 2020/0146342 A1* | 5/2020 | Elster | ................... A24D 3/067 |

FOREIGN PATENT DOCUMENTS

| | | |
|---|---|---|
| CN | 112273712 | 1/2021 |
| JP | 01-186815 | 7/1989 |
| JP | 0671159 | 3/1994 |
| JP | 09327501 | 12/1997 |
| JP | 11-342329 | 12/1999 |
| JP | 2010035487 | 2/2010 |
| WO | 2003/059503 | 7/2003 |
| WO | 2007/010407 | 1/2007 |
| WO | 2019/016226 | 1/2019 |
| WO | 2019/016229 | 1/2019 |

OTHER PUBLICATIONS

Database WPI Week 201015 Thomson Scientific, London, GB: AN:2010-B82655 & JP 2010 035487 A (Kansai Paint Co Ltd) Feb. 18, 2010 (Feb. 18, 2010).  
International Search Report dated Jun. 15, 2021 for PCT application number. PCT/JP2021/012876.

* cited by examiner

*Primary Examiner* — Philip Y Louie  
*Assistant Examiner* — Morgan Faith Dezendorf  
(74) *Attorney, Agent, or Firm* — EVAN LAW GROUP LLC

(57) ABSTRACT

The present invention addresses the problem of providing a double-layer seamless soft capsule having a water-soluble composition as its fill, and by preparing a capsule shell from an ultraviolet-curing resin composition, a double-layer seamless capsule is made which consists of a capsule shell and a water-soluble composition as a fill and where volatility of the fill due to permeation through the shell is low.

8 Claims, No Drawings

DOUBLE-LAYER SEAMLESS CAPSULE CONTAINING WATER-SOLUBLE COMPOSITION

TECHNICAL FIELD

The present invention relates to a double-layer seamless capsule consisting of a capsule shell provided from an ultraviolet-curing resin composition and a water-soluble composition as a fill. The capsule of the present invention can have a water-soluble flavor or the like as the fill.

BACKGROUND ART

A dropping method (also called an in-liquid gelling method) utilized for the production of seamless capsules is a capsule production method utilizing liquid-liquid (filling solution-shell solution, shell solution-cooled oil liquid) interfacial tension or gas-liquid (air-shell solution) surface tension. Conventionally, a production method including discharging, into a cooled oil liquid, a water-soluble composition for a shell (for example, aqueous solution of gelatin) and a hydrophobic filling solution from an outer nozzle and an inner nozzle of a concentric double nozzle, respectively, to form concentric double droplets, then cooling an outer droplet (shell solution) to allow it to gel and thereby performing encapsulation is widely carried out. In this production method, there is a problem that when the composition for a shell, which is used as the shell, is water-soluble, the capsule fill is limited to oils and fats, an oil and fat solution of an oil-soluble substance, or the like, which have interfacial tension with the composition for a shell, and a water-soluble component cannot be encapsulated. Then, an encapsulation method by dispersing a water-soluble component in an oily liquid (see for example, patent document 1) or by emulsifying it therein (see for example, patent documents 2 and 3) has been developed.

Moreover, as a capsule to be enclosed in a filter part of a cigarette, a capsule having a shell composed of at least one hydrophilic colloid selected from gellan gum, agar, an alginate, carrageenan, pectin, gum arabic, ghatti gum, pullulan gum, mannan gum and modified starch, singly, or a mixture of these or a mixture thereof with gelatin, and a core of a substance or a product which is lipophilic or partially soluble in ethanol, or an oil/water/oil type emulsion has been proposed (see for example, patent document 4).

On the other hand, as a capsule whose fill is a hydrophilic substance, a seamless capsule consisting of a fill and a shell for coating the fill, wherein the fill is a hydrophilic substance, and a lower fatty acid ester of sucrose is interposed between the fill and the shell has been proposed (see for example, patent document 5). However, in such a capsule, isolation of the shell from a component contained in the core is insufficient, and it is only possible to temporarily prevent direct contact of the component contained in the core with the capsule shell.

PRIOR ART DOCUMENTS

Patent Documents

Patent Document 1: Japanese unexamined Patent Application Publication No. 1-186815
Patent Document 2: Japanese unexamined Patent Application Publication No. 11-342329
Patent Document 3: Japanese unexamined Patent Application Publication No. 9-327501

Patent Document 4: Japanese unexamined Patent Application Publication No. 2014-166188
Patent Document 5: Japanese unexamined Patent Application Publication No. 3-52639

SUMMARY OF THE INVENTION

Object to be Solved by the Invention

It is an object of the present invention to provide a double-layer seamless capsule containing a water-soluble composition.

Means to Solve the Object

The present inventors have studied various shell compositions in the case where water or a water-soluble composition such as a water-soluble flavor is used as a capsule fill, and they have confirmed that by preparing a capsule shell from an ultraviolet-curing resin composition, volatility due to permeation of the fill through the shell is decreased, and therefore, volatilization of the aroma component is reduced, and they have completed the present invention. The present invention can also be applied to a seamless capsule of three or more layers.

That is to say, the present invention is as follows.

[1] A double-layer seamless capsule consisting of a capsule shell provided from an ultraviolet-curing resin composition and water or a water-soluble composition as a fill.

[2] The seamless capsule according to "1", wherein a viscosity of the ultraviolet-curing resin composition is 20 to 2000 mPa·s.

[3] The seamless capsule according to "1" or "2", wherein the ultraviolet-curing resin composition is an acrylic resin composition, an epoxy-based resin composition or a silicone resin composition.

[4] The seamless capsule according to any one of "1" to "3", wherein the acrylic resin composition comprises an acrylic oligomer, an acrylic monomer and a photopolymerization initiator.

[5] The seamless capsule according to any one of "1" to "4", wherein the water-soluble composition comprises water, a water-soluble flavor, a water-soluble alcohol, glycerol or propylene glycol.

[6] The seamless capsule according to any one of "1" to "5", wherein a shell thickness of the thinnest part of the capsule shell, as measured using a three-dimensional X-ray microscope, is 100 μm or more.

[7] The seamless capsule according to any one of "1" to "6", having a diameter of 1 to 6 mm.

[8] The seamless capsule according to any one of "1" to "7", having a mass decrease of less than 5% after stored at 20° C. for 60 days.

[9] The seamless capsule according to any one of "1" to "8", being enclosed in a filter of a cigarette.

[10] A method for making a double-layer seamless capsule having a fill and a shell for covering the fill, the method having the following steps (a) to (c):

(a) a step of providing (preparing) water or a water-soluble composition as the fill;

(b) a step of providing an ultraviolet-curing resin composition as a capsule-shell solution; and (c) a step of discharging, into a forming liquid, the capsule-shell solution from an outer nozzle and the water or the water-soluble composition from an inner nozzle by the use of a concentric double nozzle to form a double-layer droplet, and irradiating the double-layer droplet with ultraviolet rays to cure the capsule-shell solution and thereby give a capsule shell.

Effect of the Invention

According to the present invention, a seamless soft capsule with little volatilization of a volatile component in the fill can be provided.

Mode of Carrying Out the Invention

The double-layer seamless capsule of the present invention is not particularly restricted as long as it is a double-layer seamless capsule consisting of a capsule shell provided (prepared) from an ultraviolet-curing resin composition and a water-soluble composition as its fill, and the capsule shell is obtained by irradiating the ultraviolet-curing resin composition with ultraviolet rays, and such ultraviolet-curing (curable) resins are broadly divided into radical polymerization type resins and cationic polymerization type resins according to a difference in reaction mechanism.

When the ultraviolet-curing resin is a radical polymerization type resin, an acrylic resin or a silicone resin can be preferably mentioned as the radical polymerization type resin, and the acrylic resin is not particularly limited as long as an element to constitute a skeleton of the polymer is a (meth)acrylic monomer, and it is, for example, one or more (meth)acrylic polymers selected from (meth)acrylic acid, methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, cyclohexyl (meth)acrylate, 2-ethylhexyl (meth)acrylate, lauryl (meth)acrylate, stearyl (meth)acrylate, benzyl (meth) acrylate, a (fluoro)alkyl ester of (meth)acrylic acid such as 2-trifluoroethyl (meth)acrylate, 2-hydroxyethyl (meth)acrylate, 2-hydroxypropyl (meth)acrylate, 4-hydroxybutyl (meth)acrylate, glycidyl (meth)acrylate, methyl glycidyl (meth)acrylate, 3,4-epoxycyclohexylmethyl (meth)acrylate, (meth)acryloylmorpholine, and allyl (meth)acrylate. Unless otherwise stated, the "(meth)acrylate" (or "(meth)acrylic") means methacrylate (or methacrylic) and/or acrylate (or acrylic).

As the acrylic resin composition, an acrylic resin composition comprising a photopolymerizable (meth)acrylate-based oligomer and/or a photopolymerizable (meth)acrylate-based monomer, and a photopolymerization initiator can be preferably mentioned.

The photopolymerizable (meth)acrylate-based oligomer (meth)acrylate oligomer having, in a molecule, an acryloyl group which is a radically polymerizable functional group, and examples thereof include a (meth)acrylate oligomer and a urethane (meth)acrylate oligomer each having one or more skeletons selected from the group consisting of skeletons of polyalkylene, polybutadiene, hydrogenated polybutadiene, polyisoprene and hydrogenated polyisoprene.

Examples of the acrylate-based monomers include, but not limited to, a monofunctional monomer, such as 2-ethylhexyl acrylate, 2-hydroxyethyl acrylate or 2-hydroxyethylacryloyl phosphate, a bifunctional monomer, such as 1,3-butanediol diacrylate, 1,6-hexanediol diacrylate or diethylene glycol acrylate, and a tri- or higher functional acrylic monomer, such as trimethylolpropane triacrylate, pentaerythritol triacrylate or dipentaerythritol hexaacrylate. These monomers may be used singly or may be used in combination of two or more kinds.

The photopolymerization initiator contained in the acrylic resin composition is not particularly restricted as long as it is a compound which responds to ultraviolet rays and can initiate radical polymerization, and examples thereof include a benzoyl alkyl ether, such as benzophenone, benzoyl ethyl ether, benzoyl methyl ether or benzoyl isopropyl ether; a 2,4,5-triarylimidazole dimer, such as a 2-(o-chlorophenyl)-4,5-diphenylimidazole dimer, a 2-(o-chlorophenyl)-4,5-bis-(m-methoxyphenyl)imidazole dimer or a 2-(p-methoxyphenyl)-4,5-diphenylimidazole dimer; and a sulfur compound, such as dibenzoyl sulfide or tetramethylthiuram sulfide.

As the acrylic resin composition, a commercial product can also be used, and specific examples thereof include TB3042B, TB3066, TB3013D, TB3067, TB3064E, TB3094B (all manufactured by ThreeBond Co., Ltd.), Hitaroid 7975, Hitaroid 7988, Hitaroid 7975D (all manufactured by Hitachi Chemical Company Ltd.), UV-7605B, UV-7620EA (all manufactured by Mitsubishi Chemical Holdings Corporation), and Aronix Series (manufactured by TOAGOSEI CO., LTD.).

The silicone resin is a polymer compound having a siloxane bond as a main chain. As the silicone resin composition, a commercial product can also be used, and specific examples thereof include TB3161, TB3163, TB3164D (all manufactured by ThreeBond Co., Ltd.), and KUV-3433-UV, KER-4700-UV, KER-4800-UV (all manufactured by Shin-Etsu Chemical Co., Ltd.).

When the ultraviolet-curing resin is a cationic polymerization type resin, an epoxy-based resin can be preferably mentioned as the cationic polymerization type resin, and the epoxy-based resin is, for example, one or more epoxy resins of a bisphenol A type epoxy resin, a bisphenol F type epoxy resin, a bisphenol S type epoxy resin, a bisphenol AD type epoxy resin, a naphthalene type epoxy resin, a biphenyl type epoxy resin, a glycidyl amine type epoxy resin, a brominated bisphenol A type epoxy resin, a hydrogenated bisphenol A type epoxy resin, an alicyclic epoxy resin, a dicyclopentadiene type epoxy resin, a phenolic novolak type epoxy resin, and an orthocresol novolak type epoxy resin.

As the epoxy-based resin composition, an epoxy-based resin composition comprising a cationically polymerizable compound for forming an epoxy resin and a photopolymerization initiator can be preferably mentioned.

The cationically polymerizable compound for forming an epoxy resin is, for example, a compound having, in one molecule, one or more epoxy groups having a cationically polymerizable group, and specific examples thereof include an epoxy compound containing an alicyclic epoxy group, such as cyclopentadiene dioxide, (3,4-epoxycyclohexyl) methyl-3,4-epoxycyclohexane carboxylate, bis(2,3-epoxy-cyclopentyl) ether, bis(3,4-epoxycyclohexylmethyl) adipate, bis(3,4-epoxy-6-methylcyclohexylmethyl) adipate, (3,4-epoxy-6-methylcyclohexyl)methyl-3,4-epoxy-6-methylcyclohexane carboxylate, bis(3,4-epoxycyclohexylmethyl)acetal, bis(3,4-epoxycyclohexyl) ether of ethylene glycol, 3,4-epoxycyclohexanecarboxylic acid diester of ethylene glycol, (3,4-epoxycyclohexyl)methyl alcohol, (3,4-epoxycyclohexyl)ethyltrimethoxysilane, or 3-ethyl-3-(3,4-epoxycyclohexylmethyl)oxymethyloxetane; an epoxy compound containing an aliphatic epoxy group, such as ethylene glycol diglycidyl ether, propylene glycol diglycidyl ether, polyethylene glycol diglycidyl ether, polypropylene glycol diglycidyl ether, 1,4-butnediol diglycidyl ether, neopentyl glycol diglycidyl ether, 1,6-hexanediol diglycidyl ether, glycerol diglycidyl ether, diglycerol tetraglycidyl ether, trimethylolpropane triglycidyl ether, spiroglycol diglycidyl ether, 2,6-diglycidyl phenyl ether, sorbitol polyglycidyl ether, triglycidyl isocyanurate, bisphenol A diglycidyl ether, butadiene dioxide, phthalic acid diglycidyl ester, 3-ethyl-3-glycidyl oxymethyloxetane, a halogenated bisphenol A type epoxy resin, a bisphenol F type epoxy resin, an o-, m- or p-cresol novolak type epoxy resin, or a phenolic novolak type epoxy resin; and an epoxy compound containing an alicyclic epoxy group and an aliphatic epoxy group, such as vinylcyclohexene dioxide or limonene dioxide, and these compounds can be used singly or in combination of two or more kinds.

The photopolymerization initiator contained in the epoxy-based resin composition is, for example, a compound which responds to ultraviolet rays to form a cationic polymerization initiator, and examples thereof include a diazonium salt, such as $$ArN_2 \cdot PFe^-, \ ArN_2 \cdot SbFe^-, \ ArN_2 \cdot AsFe^-, \ (ArN_2^+)_2SnCl_6^- \ or \ ArN_2 \cdot FeCl_4^-$$

(wherein Ar represents $C_6H_5$); and an arylsulfonium salt, e.g., a benzylmethylsulfonium salt, such as a p-phenylbenzylmethylsulfonium salt, a p-phenyldimethylsulfonium salt or a p-hydroxyphenylbenzylmethylsulfonium salt, or a tri-arylsulfonium salt, such as a triphenylsulfonium salt or a diphenyl-4-thiophenoxyphenylsulfonium salt.

As the epoxy-based resin composition, a commercial product can also be used, and specific examples thereof include TB3121D (manufactured by ThreeBond Co., Ltd.), Hitaroid 7663 (manufactured by Hitachi Chemical Company Ltd.), ARON OXETANE (manufactured by TOAGO-SEI CO., LTD.), and LUXYDIR Series (manufactured by DIC Corporation).

To the ultraviolet-curing resin composition, a photosensitizer, a polymer gelling agent, a gelling aid, a shell-strengthening agent, a plasticizer, a colorant, etc. can be further added.

A viscosity of the ultraviolet-curing resin composition is 20 to 2000 mPa·s, and preferably 100 to 1500 mPa·s. If the viscosity is high, the composition easily involves air bubbles, and handling thereof during production is difficult, so that it becomes hard to obtain a good capsule.

The fill of the double-layer seamless capsule of the present invention is not particularly restricted as long as it is a water-soluble composition (aqueous composition), and a plurality of hydrophilic substances may be dissolved in water. The hydrophilic substance in the present invention is not particularly restricted as long as it has, in a part of its molecular structure, a functional group easily forming a bond between it and a water molecule, such as a hydroxyl group, a carboxyl group, an amino group, a ketone group or a sulfo group, and is a substance soluble in water, and specific examples thereof include a water-soluble solvent, such as water, a water-soluble alcohol, glycerol or propylene glycol, a water-soluble vitamin, a sugar alcohol, a natural sweetener, an artificial sweetener, an oligosaccharide, a polysaccharide, and a water-soluble flavor.

Examples of the water-soluble vitamins include a B-group vitamin, such as vitamin B1 (thiamine), vitamin B2 (riboflavin), vitamin B3 (niacin, nicotinamide), vitamin B5 (pantothenic acid, dexpanthenol), vitamin B6 (pyridoxin, pyridoxal phosphate, pyridoxamine), vitamin B7 (biotin), vitamin B9 (folate) or vitamin B12 (cyanocobalamin, methylcobalamin), and vitamin C (ascorbic acid, dehydroascorbic acid).

Examples of the sugar alcohols include erythritol, xylitol, sorbitol, palatinit, maltitol, lactitol, and mannitol.

Examples of the natural sweeteners include sucrose, stevia, glycyrrhizin, and *Siraitia grosvenori*. Examples of the artificial sweeteners include saccharin, aspartame, acesulfame potassium, and sucralose.

Examples of the oligosaccharides include fructo-oligosaccharide, galacto-oligosaccharide, xylooligosaccharide, palatinose oligosaccharide, agaro-oligosaccharide, chitin oligosaccharide, isomalto-oligosaccharide, malto-oligosaccharide, raffinose, and lactulose. Examples of the polysaccharides include water-soluble polysaccharides which do not gel by cooling, such as alginic acid propylene glycol ester, gum arabic, tragacanth gum, karaya gum, ghatti gum, xanthan gum, guar gum, locust bean gum, tara gum, λ-carrageenan, μ-carrageenan, ν-carrageenan, cellulose, and starch.

The water-soluble flavor is not particularly restricted as long as it is a flavor composition which has a function of, for example, strengthening the scent inherent in food or the like (flavoring), supplementing the scent inherent in a food material (perfuming), or improving the flavor when an odor unsuitable for food, such as cooked odor in the processing step or fermentation odor, is generated (masking), and which has properties of a hydrophilic substance, and examples thereof include a water-soluble natural flavor, a water-soluble synthetic flavor, a water-soluble flavor, and an oil-in-water type emulsified flavor.

Specific examples include a so-called recovered flavor obtained by subjecting a plant material to processing, such as drying, shredding or pulverizing, and then extracting it with a water-soluble solvent, such as ethanol, 1,3-butanediol, propylene glycol or glycerol; a flavor prepared by adding a plant into ethanol, stirring them, then allowing the resulting mixture to stand at a low temperature to separate it into a lower layer containing a flavor substance (hydrous ethanol layer) and an upper layer containing a water-insoluble component, and recovering the hydrous ethanol layer of the lower layer by means of filtration or the like; and a water-soluble flavor prepared by extracting a plant material with an organic solvent, and adding ethanol, glycerol, propylene glycol or the like to perform solvent recovery and thereby obtain an aroma concentrate (for example, Japanese Patent No. 6032991).

Examples of the water-soluble natural flavors include a citrus-based natural flavor, such as lime, grapefruit or orange, a mango-based natural flavor, an apple-based natural flavor, a grape essence, a pineapple-based natural flavor, and a strawberry-based natural flavor.

The water-soluble synthetic flavor is not particularly restricted as long as it is a chemically synthesized water-soluble flavor, and examples thereof include hexanol, phenylethyl alcohol, cis-3-hexenol, nerolidol, isoamyl alcohol, citronellol, menthol, pentanol, cinnamyl alcohol, 1-octen-3-ol, *perilla* alcohol, farnesol, linalool, terpineol, geraniol, benzyl alcohol, and furfuryl alcohol.

The water-soluble flavor (essence) is, for example, a flavor obtained by diluting a flavor base made by mixing a large number of oil-soluble and/or water-soluble natural flavors or synthetic flavors, with a substance which is soluble in water, such as ethanol or glycerol, and examples thereof include a lemon essence, a lime essence, a grapefruit essence, an orange essence, a Yuzu essence, an apple essence, a melon essence, a mint essence, a honey essence, a strawberry essence, a blackcurrant essence, a cranberry essence, a cherry essence, a pineapple essence, a *papaya* essence, a banana essence, a blueberry essence, a mango essence, a peach essence, a pear essence, a green tea essence, a black tea essence, a cocoa essence, a chocolate essence, a coffee essence, a yogurt essence, a cinnamon essence, a ginger essence, a thyme essence, a nutmeg essence, a Japanese mint essence, and a vanilla essence.

The oil-in-water type emulsified flavor is, for example, an oil-in-water type emulsion (emulsified flavor) obtained by emulsifying and dispersing an oil-soluble natural flavor/synthetic flavor, in an aqueous solution using a gum arabic solution, carboxymethyl cellulose, saponin, lecithin or the like as an emulsifying agent, and examples thereof include a pineapple emulsified flavor, an orange emulsified flavor, a coffee emulsified flavor, a butter emulsified flavor, and a cheese emulsified flavor.

The powder flavor is, for example, a water-soluble flavor obtained by emulsifying a flavor base made by mixing a large number of natural flavors or synthetic flavors with a diluent base, such as dextrin, a natural gummy matter, sugar or starch, and then spray drying the resulting emulsion to powder it, and examples thereof include a lemon powder flavor, an orange powder flavor, an apple powder flavor, a butter powder flavor, a cheese powder flavor, and a vanilla powder flavor.

The fill can be prepared by further adding a water-soluble coloring matter, a polysaccharide thickener, and a dietary fiber such as pectin within a range which does not interfere with the effects of the present invention.

The method for producing a double-layer seamless capsule of the present invention is, for example, a method for producing a seamless capsule conventionally used, such as a dropping method, and an ultraviolet-curing resin composition as a shell solution and a water-soluble composition as the fill are discharged from an outer nozzle of a concentric double nozzle and an inner nozzle thereof, respectively, at the same time to introduce them into a forming liquid, and due to the interfacial tension, a double-layer droplet is formed. The ultraviolet-curing resin composition which is a shell solution on the outer side of the double-layer droplet is irradiated with ultraviolet rays and thereby cured to form a capsule shell while it moves in the forming liquid, and thus, a water-soluble composition-encapsulated capsule is formed.

The method for curing the resin in the ultraviolet-curing resin composition in the double-layer droplet is not particularly restricted as long as it is a method capable of curing the shell by irradiating it with ultraviolet rays, and the method is, for example, a method including introducing a capsule together with a forming liquid into a tube of a material having high ultraviolet transmission, such as glass or quartz, and irradiating them with UV light sources from one or more directions in such a manner that the tube is interposed between the light sources.

The wavelength of the ultraviolet rays for ultraviolet curing the resin composition of the present invention is preferably a wavelength in an energy region of 210 nm to 470 nm, preferably 270 nm to 410 nm. The light intensity is $5 \text{ kJ/m}^2$ to $50 \text{ kJ/m}^2$, and preferably $10 \text{ kJ/m}^2$ to $35 \text{ kJ/m}^2$, in terms of an integrated quantity of light, and in order to obtain such a quantity of light or in order to obtain a prescribed integrated quantity of light, it is necessary to properly change the movement speed of a capsule and the irradiation speed, and for example, when an integrated quantity of light of $15 \text{ kJ/m}^2$ is required, the movement speed of a capsule is set to, for example, 5 cm/s, and irradiation is carried out, for example, at an irradiation speed of $3 \text{ W/cm}^2$ (work distance 5 mm) for 2 seconds or more.

A preferred example of the forming liquid in the method for making a double-layer seamless capsule of the present invention is water or a water-soluble composition having been made viscous, and the forming liquid is not particularly restricted as long as it is a substance capable of making water viscous by being dissolved in or mixed with water, specifically, e.g., an aqueous solution of a so-called polysaccharide thickener, such as gum arabic, arabinogalactan, karaya gum, ghatti gum, tragacanth gum, locust bean gum, guar gum, *psyllium* seed gum, tamarind seed gum, tara gum, alginic acid, carrageenan, agar, low-molecular weight agar, furcellaran, pectin, curdlan, xanthan gum, gellan gum, pullulan, cellulose, or chitosan; soluble starch or starch glue; liquid sugar alcohol such as sorbitol liquid; polyol such as glycerol; or maltose syrup such as reduced maltose syrup, and by properly changing a dilution ratio with water, the viscosity may be adjusted to a viscosity suitable for use.

In usual capsule production, a drying step requiring a relatively long time is generally necessary. In the capsule production process of the present invention after the irradiation with ultraviolet rays, a drying step by rotary drying due to ventilation, vacuum drying or the like is not always necessary, and it is also a particularly advantageous point that promotion of efficiency of the production process is achieved.

The capsule of the present invention can be utilized by releasing its fill through rupturing, crack making, or the like of the capsule shell in some way. For rupturing the capsule shell, for example, the capsule can be pressed using part of the human body or some kind of tool. For making a crack on the capsule shell, for example, a cut can be made using a sharp tool such as a knife.

The volatility (volatilization ratio) of the capsule of the present invention is less than 5%, and preferably less than 3%, when it is expressed in terms of a mass decrease ratio of the capsule after storage at 20° C. for 60 days In the capsule of the present invention, the shell thickness of the thinnest part of the capsule shell is preferably 100 μm or more. The shell thickness of the thinnest part of the capsule shell can be measured using a three-dimensional X-ray microscope.

The shape of the seamless capsule of the present invention is not particularly restricted, but it is usually a spherical shape. By a method such as applying some kind of external force during the shaping, the capsule can be made to have a shape other than a spherical shape, such as a football shape (OVAL) or a prolate elliptical shape (OBLONG).

The particle diameter of the seamless capsule of the present invention is 1 to 6 mm, and desirably 2 to 5 mm.

The mass of the seamless capsule of the present invention is 10 to 300 mg, preferably 20 to 200 mg, and more preferably 50 to 150 mg.

Examples of the use applications of the seamless capsule of the present invention include a flavor capsule to be enclosed in a filter of a cigarette, an aromatic agent, a cosmetic, and a daily necessity.

Hereinafter, the present invention will be more specifically described with reference to examples, but the technical scope of the present invention is in no way limited to these examples.

EXAMPLES

Example 1

Ultraviolet-curing resins used in the following examples are shown in Table 1.

9

TABLE 1

| Type of shell-solution composition | Viscosity (mPa · s) | Main component |
|---|---|---|
| Ultraviolet-curing resin A | 500 | Acrylic resin |
| Ultraviolet-curing resin B | 40 | Silicone resin |
| Ultraviolet-curing resin C | 4600 | Acrylic resin |

*Viscosity: B-type viscometer (manufactured by TOKIMEC INC.)

(Water-Encapsulated Capsule)

Using, as an ultraviolet-curing resin composition, an acrylate resin composition obtained from an ultraviolet-curing resin A listed in Table 1 and comprising an acrylate oligomer, an acrylate monomer, acrylic acid and a photo-polymerization initiator, a capsule shell was provided, and using water as a fill, making of a double-layer seamless capsule was carried out.

Using a concentric double nozzle (manufactured by FUJI CAPSULE CO., LTD.), the acrylate resin composition was discharged from an outer nozzle, and water was discharged from an inner nozzle, thereby forming a double-layer drop-let. The movement speed of the double-layer droplet in a forming liquid having been adjusted to a viscosity of 10 mPa·s (25° C., B-type viscometer) was set to 5 cm/s.

The double-layer droplet was introduced into a glass tube of 20 cm together with the forming liquid, then two line-type UV light sources (E110 II HD, Ushio Inc.) were installed in such a manner that the glass tube was interposed between them, and irradiation with ultraviolet rays (wavelength 365 nm) was carried out from two directions to cure the shell. Since the integrated quantity of light to cure the ultraviolet-

10 value of the thinnest part of the capsule shell was 100 μm or more were collected to measure an average total mass, they were stored in a glass bottle under the conditions of 20° C., then based on the total mass measured on the 30th day and 60th day, a mass decrease ratio from the mass of the storage start date was calculated, and the results are set forth in Table 2.

TABLE 2

| | | Storage period (days) | |
|---|---|---|---|
| | | 30 | 60 |
| Retention (%), n = 5 capsules | Water | 99.0 | 98.6 |
| | Grapefruit flavor aqueous solution | 99.1 | 98.8 |
| | 20% Ethanol solution | 98.8 | 95.5 |

(Results)

As is obvious from Table 2, when water was used as the fill, a capsule in which the shell thickness of the thinnest part was 100 μm or more had a mass change of less than 5% after 60 days and had low volatility, so that it is thought that the capsule was able to have sealed the fill.

(Volatility Severe Test)

Regarding volatilities of capsules in which water and the grapefruit flavor aqueous solution were each used as the fill and a capsule shell was provided using the ultraviolet-curing resin A as the ultraviolet-curing resin composition, a severe test was carried out. After the mass of each capsule was measured, the capsule was kept for 30 minutes under the vacuum conditions (50 hPa), thereafter the mass was measured, and a decrease ratio was calculated. The results are set forth in Table 3.

TABLE 3

Severe test (filling solution permeability evaluation)
Fill permeability evaluation under vacuum (50 hPa) conditions

| | Vacuum time (min) | The number of capsules | Total mass before vacuum (mg) | Total mass after vacuum (mg) | Decrease ratio (%) |
|---|---|---|---|---|---|
| Water (control) | 30 | — | 100 | 0 | 100 |
| Water-encapsulated capsule (shell: ultraviolet-curing resin A) | 30 | 6 | 198 | 198 | 0 |
| Grapefruit flavor (volatile component*-containing water-soluble flavor)-encapsulated capsule (shell: ultraviolet-curing resin A) | 30 | 4 | 203 | 203 | 0 |
| Comparative Example 1 Volatile component* 10%-containing oily flavor-encapsulated capsule (shell: carrageenan) | 30 | 12 | 193 | 188 | 2.0* |

*In Comparative Example 1, the "decrease ratio" was 2%, but only 10% of the volatile component was contained in the capsule fill (diluted with MCT), and the volatilization volume of the volatile component was about 20%.

curing resin composition was 15 kJ/m², the flow rate of the forming liquid was adjusted so that the movement speed of the capsule might become about 5 cm/s, and irradiation was carried out at an irradiation intensity of 3 W/cm² (work distance 5 mm) for 2 seconds or more.

(Volatility Test)

Regarding the water-encapsulated capsule, the shell thickness of the thinnest part of the capsule shell was measured using "high-resolution three-dimensional X-ray microscope Nano3DX" (manufactured by Rigaku Corporation), then five capsules in each of which the shell thickness measured As is obvious from Table 3, a capsule with a conventional carrageenan shell (Comparative Example) had a mass decrease ratio of about 20% based on the amount of the volatile component, and it is thought that the volatile component in the flavor permeated and leaked through the shell. On the other hand, the water-encapsulated capsule and the grapefruit essence-encapsulated capsule had no mass change (0%) under the vacuum conditions, and therefore, it has been confirmed that the capsule shell of the present invention was able to have sealed the volatile component contained in the fill.

Example 2

(Water-Encapsulated Capsule-1 Using Another Resin)

Using, as an ultraviolet-curing resin composition, a silicone resin composition obtained from the ultraviolet-curing resin B listed in Table 1, a capsule shell was provided, and using water as a fill, making of a double-layer seamless capsule was carried out in the same manner as in Example 1, and as a result, a capsule was able to be normally produced.

The double-layer droplet was introduced into a colorless and transparent tube of 20 cm together with a curing liquid-forming liquid, then two line-type UV light sources (E110 II HD, Ushio Inc.) were installed in such a manner that the tube was interposed between them, and irradiation with ultraviolet rays (wavelength 365 nm) was carried out from two directions to cure the shell, and as a result, capsule formation was possible.

Comparative Example 2

(Water-Encapsulated Capsule-2 Using Another Resin)

Using, as an ultraviolet-curing resin composition, an acrylic resin composition obtained from the ultraviolet-curing resin C listed in Table 1, a capsule shell was provided, and using water as a fill, making of a double-layer seamless capsule was attempted in accordance with Example 1, but good capsule formation was unable to be carried out.

INDUSTRIAL APPLICABILITY

The seamless capsule of the present invention can be utilized as a water-soluble composition-encapsulated seamless capsule which can stably hold a hydrophilic volatile substance for a long time, in fields of medicines, quasi drugs, cosmetics, household daily necessities, industrial goods, etc.

The invention claimed is:

1. A cigarette filter comprising:
   a double-layer seamless capsule consisting of a capsule shell and water or a water-soluble composition as a fill,
   wherein the capsule shell is prepared by curing an ultraviolet-curing resin composition,
   the ultraviolet-curing resin composition is an acrylic resin composition or a silicone resin composition,
   the acrylic resin composition comprising an acrylic oligomer, an acrylic monomer, an acrylic acid and a photopolymerization initiator,
   a viscosity of the ultraviolet-curing resin composition is 20 to 2000 mPa·s, and wherein the seamless capsule has a mass decrease of less than 5% after stored at 20° C. for 60 days.

2. The cigarette filter according to claim 1, wherein the water-soluble composition comprises water, a water-soluble flavor, a water-soluble alcohol, glycerol, or propylene glycol.

3. The cigarette filter according to claim 1, wherein a shell thickness of the thinnest part of the capsule shell, as measured using a three-dimensional X-ray microscope, is 100 μm or more.

4. The cigarette filter according to claim 1, wherein the seamless capsule has a diameter of 1 to 6 mm.

5. A method for making a cigarette filter, comprising the double-layer seamless capsule according to claim 1, wherein the double-layer seamless capsule is prepared by a method comprising the following steps (a) to (c):
   (a) a step of providing water or a water-soluble composition as the fill;
   (b) a step of providing an ultraviolet-curing resin composition as a capsule-shell solution,
      wherein the ultraviolet-curing resin composition is an acrylic resin composition or a silicone resin composition,
      the acrylic resin composition comprising an acrylic oligomer, an acrylic monomer, an acrylic acid and a photopolymerization initiator,
      wherein a viscosity of the ultraviolet-curing resin composition is 20 to 2000 mPa·s; and
   (c) a step of discharging, into a forming liquid, the capsule-shell solution from an outer nozzle and the water or the water-soluble composition from an inner nozzle by use of a concentric double nozzle to form a double-layer droplet, and irradiating the double-layer droplet with ultraviolet rays to cure the capsule-shell solution and thereby give a capsule shell, and
   the method for making the cigarette filter comprises a step of enclosing the double-layer seamless capsule in a cigarette filter.

6. The method according to claim 5, wherein the water-soluble composition comprises water, a water-soluble flavor, a water-soluble alcohol, glycerol, or propylene glycol.

7. The method according to claim 5, wherein a shell thickness of the thinnest part of the capsule shell, as measured using a three-dimensional X-ray microscope, is 100 μm or more.

8. The method according to claim 5, wherein the seamless capsule has a diameter of 1 to 6 mm.

* * * * *